March 13, 1962     J. R. HOPKINS ETAL     3,024,707
GEAR CUTTING MACHINES
Filed Sept. 10, 1958     3 Sheets-Sheet 1
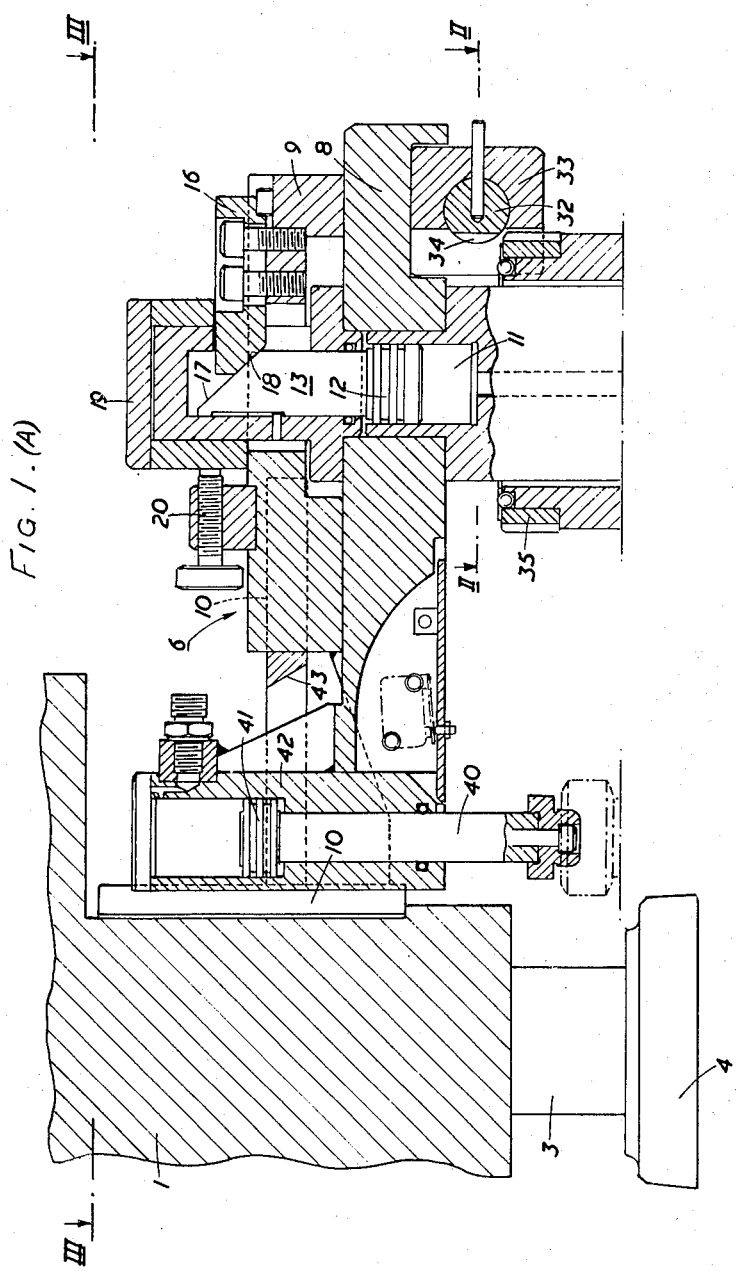
INVENTORS
Jack R. Hopkins
William Parkinson
BY
Holcomb, Wetherill & Brisebois
ATTORNEYS March 13, 1962 J. R. HOPKINS ETAL 3,024,707
GEAR CUTTING MACHINES Filed Sept. 10, 1958 3 Sheets-Sheet 3

INVENTORS
Jack R. Hopkins
William Parkinson
BY
ATTORNEYS

United States Patent Office 3,024,707
Patented Mar. 13, 1962

3,024,707
GEAR CUTTING MACHINES
Jack Rowland Hopkins, Wokingham, and William Parkinson, Staines, England, assignors to W. E. Sykes Limited, Staines, England, a British company
Filed Sept. 10, 1958, Ser. No. 760,176
Claims priority, application Great Britain Sept. 12, 1957
8 Claims. (Cl. 90—7)

The present invention relates to gear cutting machines and has for an object to provide an improved gear cutting machine.

According to the invention there is provided in or for a gear cutting machine a tail stock for supporting a workpiece, means for infeeding the tail stock towards the cutter of the machine, and pressure fluid controlled means adjustably linking the tail stock to the cutter head.

According to a further feature of the invention, in a machine in which the gear is cut in a succession of cutting operations the said infeed of the tail stock being effected between successive cuts, the pressure fluid controlled means is adapted to provide a positive lock between the tail stock and the cutter head when the tail stock is in position for effecting the final finishing cut.

According to a still further feature of the invention a means is provided for supporting a plurality of workpieces on the tail stock and for presenting the workpieces successively into position to be engaged by the cutter.

Conveniently the said workpiece supporting means comprises a rotatably mounted table or platform supported by the tail stock and which is rotated in steps to bring the workpieces successively into cutting position, in which position the workpiece is engaged by a supporting means for supporting the workpiece in desired cutting relation with respect to the cutter, the said supporting means being preferably also operated by a pressure fluid.

By suitably co-ordinating with the infeed and cutter operation the operation of the tail stock linking means, the workpiece feeding means and the workpiece supporting means, respectively, the machine can be made automatic in operation and by further providing means for a continuous supply of workpieces to the machine and for discharging the workpieces therefrom after cutting, the machine can be operated in a fully automatic continuous manner.

The invention can be usefully applied to existing gear cutting machines in which case the said tail stock is supported at one end upon the normal work supporting saddle of the machine and at the other end is connected by the said linking means to the cutter head of the machine. When the tail stock is adapted to support a plurality of workpieces for successive feeding into cutting position, a workpiece engaging means such as, for example, a pressure fluid operated chuck, is supported on the work table and engages one end of the workpiece and co-operates with a vertically adjustable pressure fluid operated secondary tail stock engaging the other end of the workpiece and supported by the linking means so that the workpiece is firmly supported in cutting position between the work table and the linking means.

One embodiment of the invention will now be described with reference to the accompanying drawings showing one method of applying the invention to a vertical type gear shaper and in which.

Figure 1:
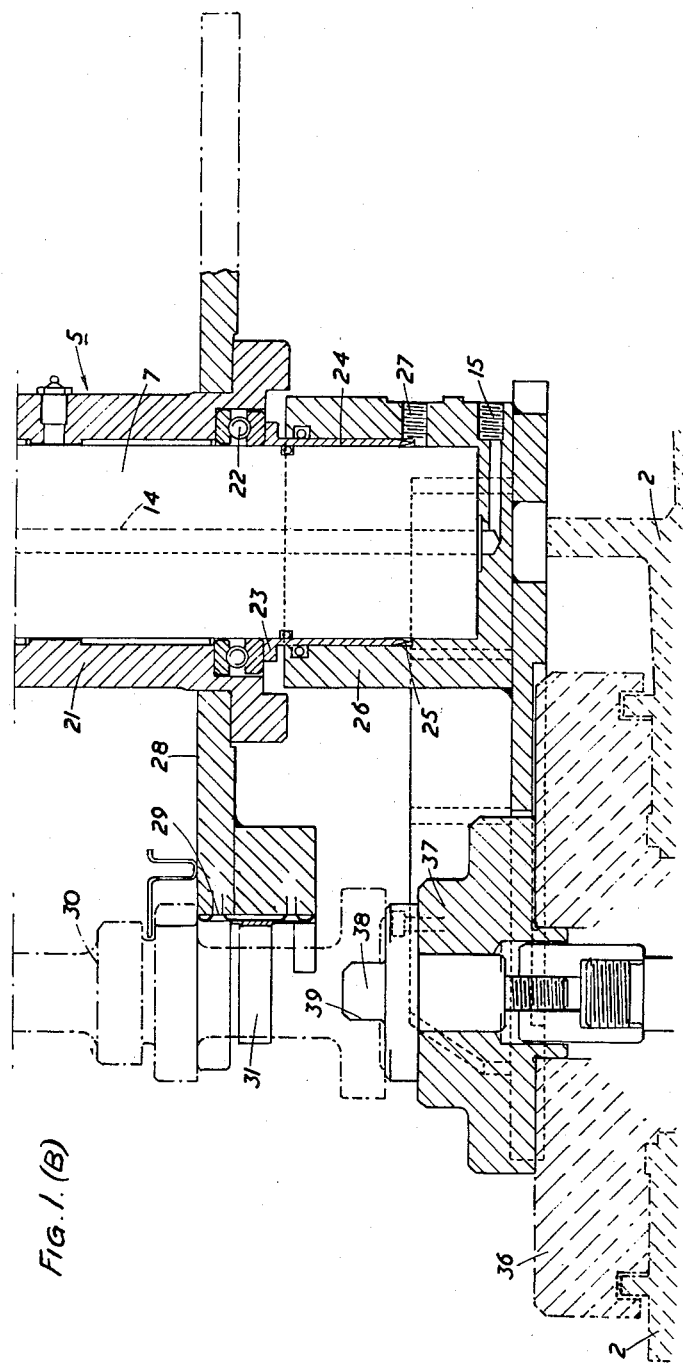
FIGURES 1A and 1B show in longitudinal sectional elevation upper and lower portions respectively of a tail stock, linking means, and associated structure according to the invention applied to a vertical type gear shaper.

In the drawings there is shown an arrangement according to the invention applied to a conventional vertical type gear shaping machine of which there is partially shown at 1 and 2 respectively the cutter head and the work feeding saddle of the machine. The cutter head supports in known manner a cutter spindle 3 having secured to the lower end thereof the cutter 4. Supported upon the saddle 2 is a main tail stock assembly indicated generally at 5 which extends upwardly from and is supported for movement with the saddle and is connected at its other upper end with the cutter head 1 by means of an hydraulically controlled linkage indicated generally at 6 which linkage is adapted to support the upper end of the tail stock in the desired spaced relation with respect to the cutter head during the infeed operation of the saddle 2 together with the tail stock assembly supported thereby. The tail stock assembly 5 comprises an upwardly extending cylindrical member 7 which engages at its upper end in a plate 8 slidably engaging the under surface of a fixed plate 9 supported by a bracket 10 secured to the cutter head of the machine, the plates 8 and 9 forming a linkage connecting the upper end of the tail stock with the cutter head of the machine. The cylindrical member 7 is provided at its upper end with an axially extending cylindrical recess 11 in which there is slidably positioned a piston 12 at the lower end of a plunger 13. The recess 11 communicates by means of a duct 14 extending longitudinally through the member 7 with an inlet 15 to which pressure liquid is supplied from a source of hydraulic pressure (not shown) so that the plunger 13 is urged upwardly into engagement with a stop 16 secured to the upper surface of the plate 9, the plunger 13 being provided with an inclined upper surface 17 which engages with a correspondingly inclined surface 18 of the stop 16.

The tail stock assembly 5 is shown in the drawing in the fully infed position and in this position a cap 19 positioned over the upper end of the tail stock member 7 engages an adjustable stop 20 and the tail stock is thus positively locked to the cutter head by the wedging action of the plunger 13, the stop 16 and the adjustable stop 20. During infeeding from the retracted position, however, it will be apparent that the plunger 13 acting on the surface 18 of the stop 16 under hydraulic pressure applied through the duct 14 maintains the upper end of the tail stock assembly correctly positioned with respect to the cutter head and in the fully infed position of the tail stock the hydraulic pressure on the plunger 13 is considerably increased to ensure an efficient wedging action between the plunger 13, the fixed stop 16 and the adjustable stop 20.

A sleeve 21 surrounds the cylindrical tail stock member 7 and is rotatably supported by a ball thrust bearing 22 at its lower end engaging the flanged upper end 23 of an annular piston 24 surrounding the member 7 and sliding within an annular channel 25 formed between the surface of the member 7 and a surrounding hollow base member 26. An inlet port 27 communicates with the lower end of the annular channel 25 so that by applying hydraulic pressure to the inlet port 27 the annular piston 24 is moved upwardly to raise the sleeve 21 for the purpose hereinafter to be described.

The sleeve 21 supports at its lower end a magazine or turret in the form of a circular plate 28 provided around its periphery with spaced recesses 29 extending inwardly from the periphery thereof and adapted to receive a workpiece such as that indicated at 30 which is releasably secured in position in the recess by means of a spring clip 31 secured to the under surface of the plate 28.

Thus a plurality of workpieces 30 are supported in the plate 28 around the periphery thereof and by rotating the sleeve 21 the workpieces can be moved in succession into position for engagement by the cutter 4.

Figure 2:
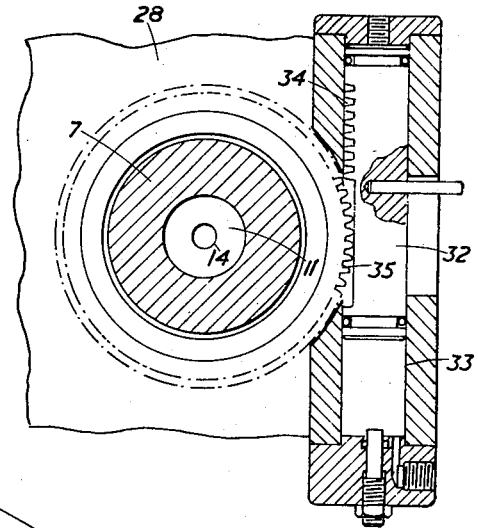
FIGURE 2 is a section taken along the line II—II of FIGURE 1A.
Figure 3:
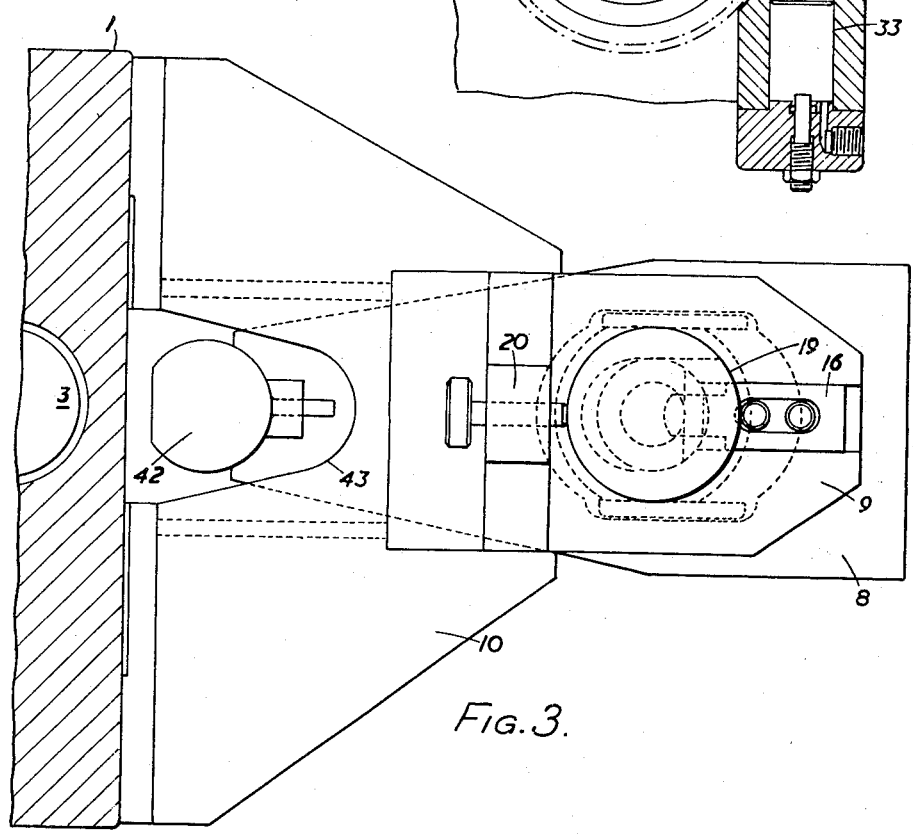
FIGURE 3 is a section taken along the line III—III of FIGURE 1.

Rotation of the sleeve 21 is effected by means of a piston 32 (FIGURE 2) slidable in a cylinder 33 secured to the under surface of the plate 8 the piston being movable in one direction or the other by means of hydraulic liquid supplied to one or the other end respectively of the cylinder. The piston has formed along the periphery thereof a rack 34 the teeth of which are adapted to engage a toothed annulus 35 secured to the upper end of the sleeve 21. It will be noted that in the lowered position of the sleeve 21 shown in FIGURE 1 the teeth of the rack 34 are disengaged from the teeth of the annulus 35 and it is only when the sleeve 21 is in the raised position that rotation thereof can be effected by means of the piston 32.

In order to support a workpiece which has been moved into cutting position by the magazine or turret 28 the work table 36 has mounted thereon an hydraulically operated chuck 37 of known construction, the work engaging member 38 of which engages in a recess 39 formed in the lower end of the workpiece 30. At its upper end the workpiece is engaged by a secondary tail stock 40 which has at its upper end a piston 41 sliding in a cylinder 42 secured to the plate 8 and therefore movable therewith, means being provided for supplying hydraulic liquid to the cylinder 42 to raise or lower the secondary tail stock 40 out of and into engagement respectively with the workpiece 30.

Thus, when hydraulic liquid is applied to the chuck 37 and the upper end of the cylinder 42 the workpiece is firmly gripped between the chuck and the secondary tail stock 40. The bracket 10 is provided with an aperture 43 to permit the cylinder 42 to move with the plate 8 as the tail stock 5 is moved from the retracted to the operative cutting position.

A suitable pump (not shown) is provided for supplying the hydraulic liquid to the various components of the structure and, although not shown in the drawing, it will be understood that the supply of liquid is controlled by known valve means, operated by limit switches, cams and cam stops and the like, for admitting the liquid of the various components in suitably timed relation to effect a cycle of operations as follows:

Assuming the tail stock assembly 5 to be in the retracted position and having indexed to place an uncut workpiece 30 in a cutting position, hydraulic liquid is admitted to the upper end of the cylinder 42 so that the secondary tail stock 40 is lowered into engagement with the upper end of the workpiece 30. Hydraulic liquid is also admitted to the chuck 37 so that the chuck clamps into the recess 39. At the same time hydraulic liquid is admitted at medium pressure to the cylinder 11 to urge the plunger 13 upwardy into engagement with the fixed stop 16.

The saddle 2 then infeeds thus moving the tail stock assembly 5 together with the magazine 28 and the work table 36 towards the cutter 4 for the normal cutting operation. During the said movement of the tail stock assembly the length of the linkage 6 connecting the upper end of the tail stock assembly to the cutter head is adjusted by relative sliding of the plates 8 and 9 which are interconnected by the plunger 13 continually engaging the fixed stop 16 under the hydraulic pressure in the cylinder 11.

After the first revolution of the workpiece the machine again infeeds for the final finishing cut and when the cutter is fully to depth the cap 19 on the upper end of the tail stock assembly 5 engages the adjustable stop 20 and the hydraulic pressure in the cylinder 11 is increased so that the tail stock is positively locked to the cutter head by the wedging action of the plunger 13 as hereinbefore mentioned. The workpiece makes one revolution with the cutter fully to depth after which hydraulic pressure is released from the cylinder 11 and the saddle retracted thereby disengaging the workpiece from the cutter. The hydraulic chuck 37 is then released and hydraulic liquid supplied to the lower end of the cylinder 42 to raise the secondary tail stock 40 out of engagement with the upper end of the workpiece. The workpiece is thus again freely supported by the magazine 28 and hydraulic pressure is admitted to the lower end of the annular cylinder 25 thereby causing the annular piston 24 to rise and lift the tail stock sleeve 21 and the magazine 28 into the raised position. In this position the toothed annulus 35 is engageable with the rack of the indexing piston 32 which is then moved by hydraulic pressure to rotate the sleeve 21 and the magazine 28 sufficient to bring a further workpiece into cutting position. Pressure is then released from the annular cylinder 25 and the sleeve 21 moves downwardly to its lowered position, in which position the toothed annulus 35 is disengaged from the rack 34 and the piston 32 is returned under hydraulic pressure to its initial position ready for effecting a further indexing operation. The chuck 37 and the secondary tail stock 40 are then operated to engage the freshly positioned workpiece and the cycle of operations is repeated.

It will be understood that although in the apparatus described the operation is effected by hydraulic pressure, fluid pressure such as, for example, compressed air, can also be employed.

It will be further understood that, although in the above described embodiment the invention is applied to a conventional vertical type gear cutter, the invention can also be incorporated in the design of a gear cutting machine and form an integral part thereof.

In order to provide for continuous fully automatic operation of the machine a suitable conveyor means could be arranged for delivering uncut workpieces to the magazine 28 and for discharging therefrom the finished workpieces.

We claim:

1. A gear cutting machine comprising a cutter head, a cutter supported by said head, means for reciprocating said cutter in a succession of cutting strokes, a tail stock, workpiece supporting means on said tail stock, means operable at one end of the tail stock for infeeding the tail stock towards the cutter head to engage a workpiece with the cutter, and pressure fluid controlled means adjustably linking the other end of the tail stock to the cutter head.

2. A gear cutting machine as claimed in claim 1, in which said infeeding means operates between successive cutting strokes of the cutter and the said linking means provides a positive lock between said other end of the tail stock and the cutter head when the tail stock is fully infed for the finishing cutting stroke.

3. A gear cutting machine comprising a cutter head, a cutter supported by said head, means for reciprocating said cutter in a succession of cutting strokes, a tail stock, a platform rotatably supported on said tail stock, means on said platform for supporting a plurality of workpieces spaced around the axis of rotation thereof, means for rotating the platform to present workpieces supported thereby successively into cutting position, means connected to one end of the tail stock for infeeding the tail stock towards the cutter head to engage a workpiece in cutting position with the cutter and pressure fluid controlled means adjustably linking the other end of the tail stock to the cutter head.

4. A gear cutting machine comprising a vertically extending cutter head, a cutter supported in said head for vertical reciprocation, a worktable, means infeeding the worktable towards the cutter head, a main tail stock secured to and extending upwardly from the worktable, a platform rotatably supported on the tail stock, means on said platform for supporting a plurality of workpieces spaced around the periphery thereof, means for rotating the platform to bring the workpieces successively into position for engagement by the cutter upon infeed of the worktable, an adjustable linkage connecting the upper end of the main tail stock to the cutter head and a pressure fluid actuated plunger supported by the main tail stock and co-operating with the linkage to maintain the upper end of the tail stock rigidly connected with the cutter head.

5. A gear cutting machine as claimed in claim 4, in which the said linkage comprises a first member supported by the upper end of the tail stock and extending horizontally therefrom, a second member secured to and extending horizontally from the cutter head and in sliding engagement with the said first member, registering apertures in said first and second members through which the said plunger extends, and co-operating surfaces on said plunger and on one of the members providing a rigid connection between the tail stock and the cutter head during relative sliding of the said members as the tail stock is infed towards the cutter head.

6. A gear cutting machine as claimed in claim 5, and further including adjustable stop means on one of said members for co-operating with the said plunger and said co-operating surfaces to lock the upper end of the tail stock positively to the cutter head when a workpiece supported by the platform in cutting position is fully infed towards the cutter.

7. A gear cutting machine as claimed in claim 4, further including a fluid pressure operated chuck for engaging the lower end of a workpiece supported in the cutting position by said platform and a secondary fluid pressure operated tail stock supported by the main tail stock and positioned vertically above the said chuck and operable by fluid pressure to move downwardly into engagement with the upper end of the said workpiece, thereby firmly to grip the workpiece between the chuck and the secondary tail stock during the cutting operation.

8. A gear cutting machine as claimed in claim 7, provided with control means for sequentially effecting operation of the several fluid pressure operated means to provide a sequence of operations in which the platform is raised and then indexed to move a workpiece into cutting position and then lowered, the chuck and the secondary tail stock are operated to grip the workpiece, the infeed and cutter are operated to effect the cutting operation after which the chuck and secondary tail stock are disengaged and the platform again raised and then indexed to bring a fresh workpiece into cutting position.

References Cited in the file of this patent
FOREIGN PATENTS 1,017,885     Germany _____ Oct. 17, 1957
1,140,818     France _____ Mar. 4, 1957